March 22, 1966   C. W. MAXWELL   3,241,372
APPARATUS FOR SAMPLING THE FLOW OF A LIQUID FROM
A LIQUID-GAS MIXTURE Filed Nov. 20, 1963   4 Sheets-Sheet 1

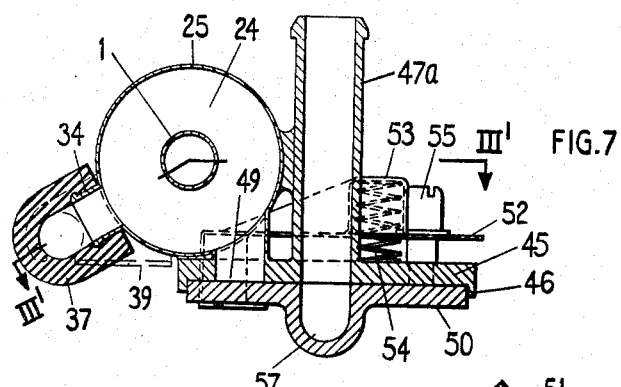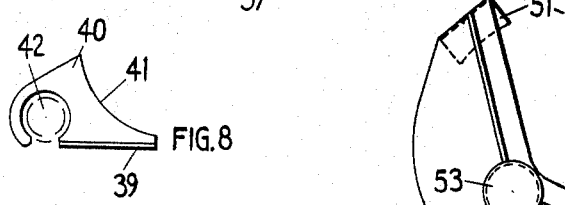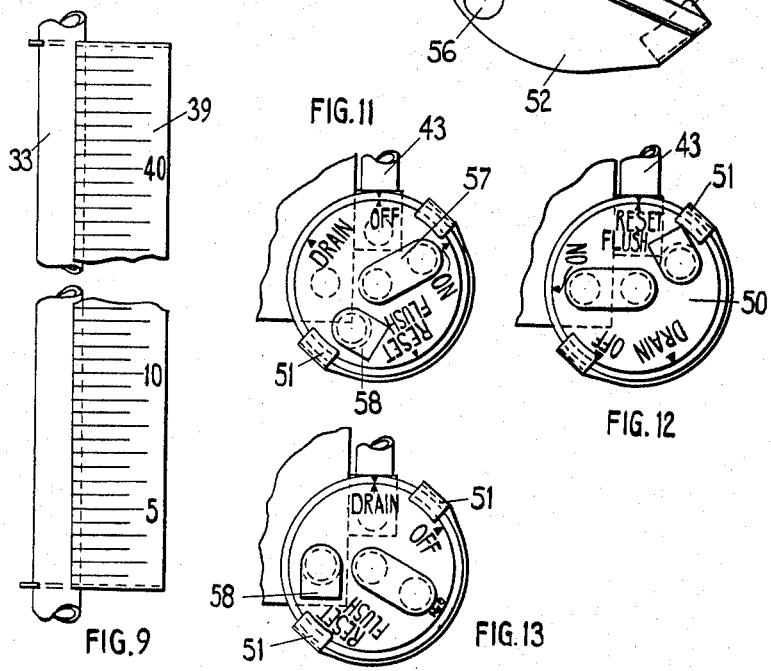

United States Patent Office 3,241,372
Patented Mar. 22, 1966

3,241,372
APPARATUS FOR SAMPLING THE FLOW OF A LIQUID FROM A LIQUID-GAS MIXTURE
Charles William Maxwell, Leith Road, Okato, Taranaki, New Zealand
Filed Nov. 20, 1963, Ser. No. 325,106
Claims priority, application New Zealand, Nov. 29, 1962, 133,660; Mar. 28, 1963, 134,540
17 Claims. (Cl. 73—422)

This invention relates to apparatus for sampling the flow of a liquid from a fluid at least some of which is a liquid and has been designed particularly although not solely for use in the sampling of milk given by an individual cow for example during herd testing activities.

It is an object of the present invention to provide apparatus for sampling the flow of a liquid from a fluid at least some of which is a liquid so that the sample of liquid is substantially proportional to the total flow of liquid in the fluid.

Accordingly the invention may be said to consist in apparatus for sampling a flow of liquid from a fluid at least some of which is a liquid said apparatus comprising flow control means adapted to control the flow of said fluid to provide at any instant a substantially uniform flow of liquid relative to the surface over which said fluid is flowing prior to passing from said flow control means, dividing means adapted to receive said fluid from said flow means and divide said flow of liquid into a plurality of flows under substantially uniform conditions with at least one of said flows being a sampling flow, sampling means adapted to receive said sampling flow and collect the liquid in said sampling flow in a sampling vessel to provide a volume of liquid substantially proportional to the total volume of liquid flowing during the sampling process and discharge means adapted to discharge the remainder of said fluid from said apparatus.

Figure 1:
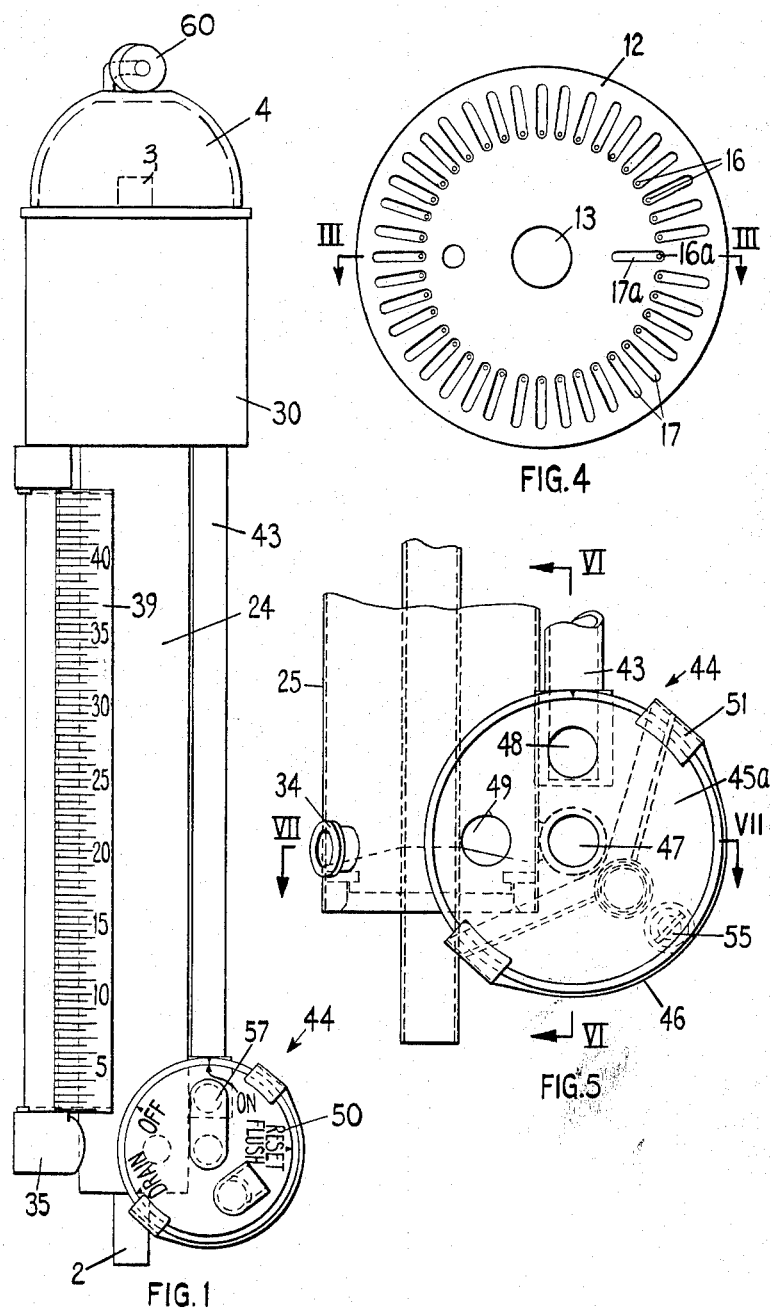
Figure 2:
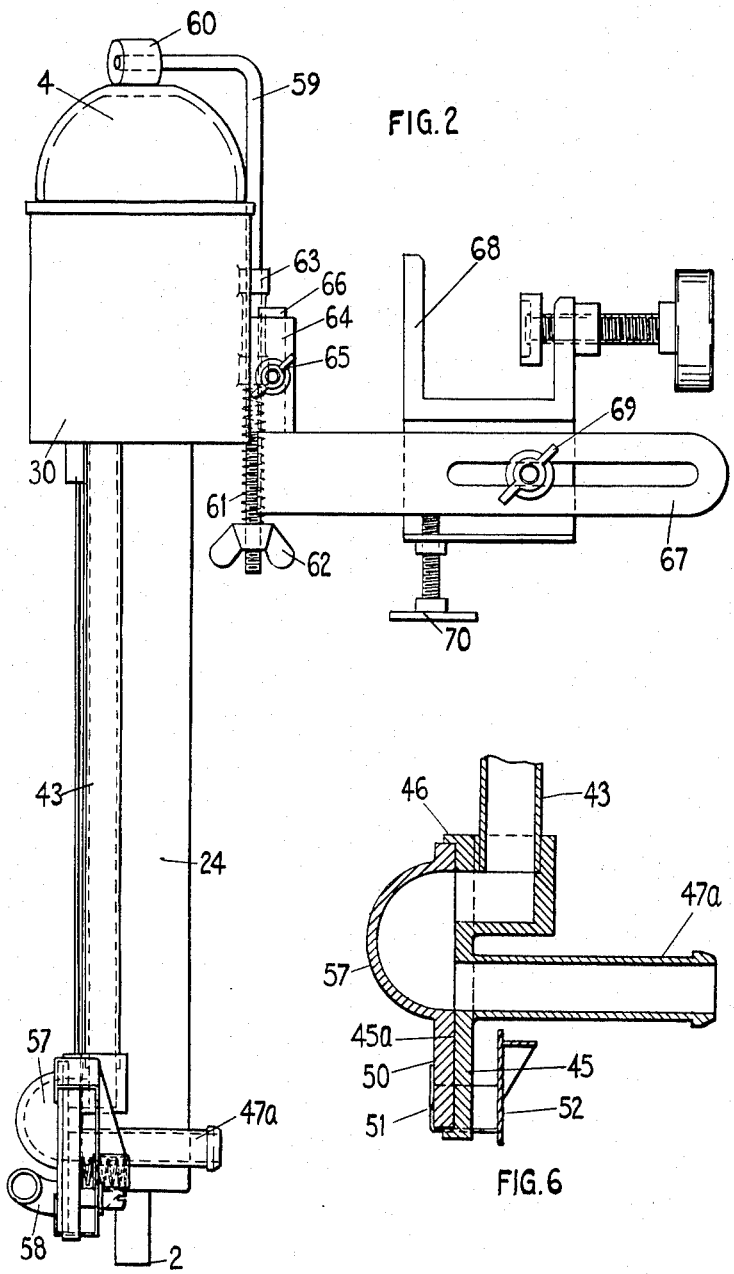
Figure 3:
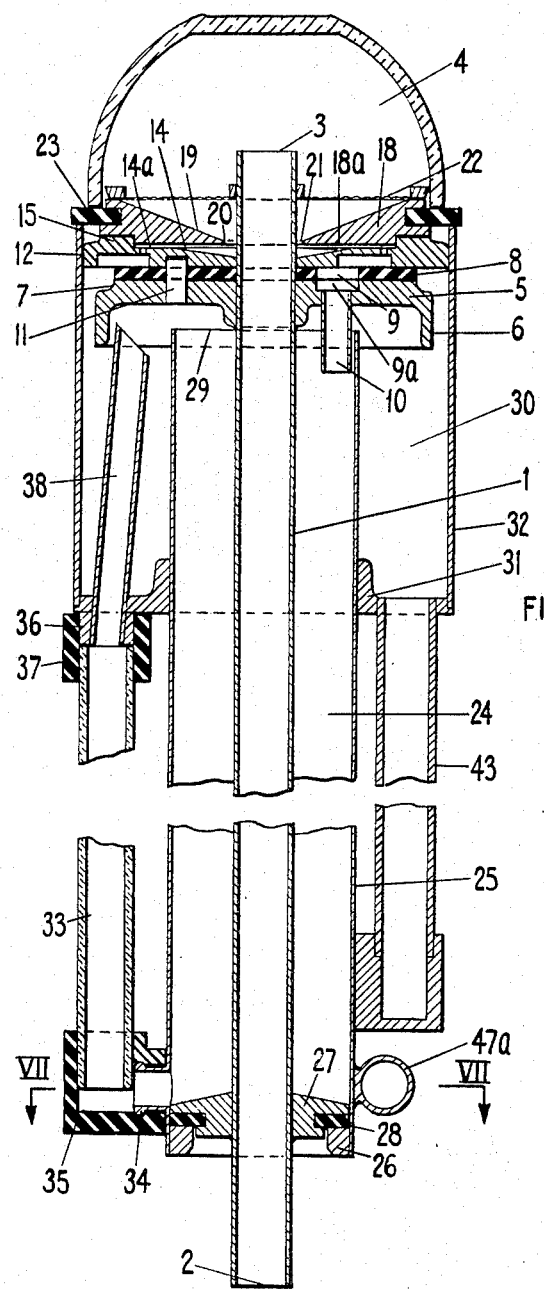

One preferred form of the invention will now be described with reference to the accompanying drawings in which:

FIGURE 1 is a front elevation of the apparatus according to the present invention, FIGURE 2 is a side elevation of the apparatus shown in FIGURE 1, FIGURE 3 is a broken axial section through the apparatus with the upper part being on a plane III—III shown on FIGURE 4 and the lower part being on a plane III'—III' shown on FIGURE 7, FIGURE 4 is a bottom view of the metering member, FIGURE 5 is a fragmentary front elevation of the lower portion of the apparatus with the disc member of the valve and the gauge glass omitted, FIGURE 6 is a vertical section on the plane VI—VI FIGURE 5 with some parts being omitted for clarity, FIGURE 7 is a horizontal section in the plane VII—VII FIGURE 5, FIGURE 8 is a plan view of the scale and mounting bracket to be fitted to the gauge glass, FIGURE 9 is a broken front elevation of the gauge glass with the scale supported by the mounting bracket attached thereto, FIGURE 10 is a rear view of the holding means for the control valve, FIGURE 11 is a fragmentary front elevation showing the control valve in the "off" position, FIGURE 12 is a fragmentary front elevation showing the control valve in the "reset/flush" position and FIGURE 13 is a fragmentary elevation showing the control valve in the "drain" position.

In the preferred form of the invention the apparatus for sampling the flow of a liquid from a fluid at least some of which is a liquid has an inlet conduit 1 extending concentrically through the remainder of the apparatus and adapted in use to be supported in a substantially perpendicular position. The lower end 2 protrudes beyond the bottom of the remaining portion of the apparatus and is adapted to be connected to the milk tube extending from the teat cups of a normal milking plant. The upper end 3 discharges into a diffusion chamber 4 which forms part of the flow control means.

The diffusion chamber 4 is formed by a glass bowl to give a visual indication of the amount of milk delivered.

A circular shield member 5 is fixed to the inlet conduit 1 and extends radially therefrom in a plane substantially normal to the longitudinal axis of the inlet conduit. The shield member 5 has a dependent peripheral skirt 6 with an annular rounded rebate 7 provided on the upper edge.

A circular sealing pad 8 is supported on the top surface of the shield member 5 with the circumference of the sealing pad 8 corresponding to the inner periphery of the rebated section 7. The sealing pad 8 is formed from rubber or other suitable sealing material.

An aperture 9 extends through the sealing pad 8 with a corresponding and communicating aperture 9a extending through the shield member 5. A short length of conduit 10 extends from the aperture 9a to a position slightly below the lower periphery of the skirt 6.

A positioning dowel 11 is attached to the shield member 5 and protrudes above the upper surface thereof sufficiently to pass for a short distance through an appropriate aperture in the sealing pad 8.

A circular metering member 12 is supported on the sealing pad 8 with a centrally positioned aperture 13 providing a clearance fit over the inlet conduit 1. A detailed under view of this member is shown in FIGURE 4. The upper surface 14 of the metering member 12 is dished inwardly towards the inlet conduit to provide a small ponding area to assist in the equal distribution of liquid when only a very small volume of liquid is being delivered in the fluid for example at the end of milking a cow. A further annular portion 14a of the upper surface is positioned in a plane substantially at right angles to the longitudinal axis to the inlet conduit 1.

An annular collar 15 positioned towards the outer periphery of the metering member extends from the upper surface thereof.

A plurality of apertures 16 are formed through the metering member 12 and are positioned in a circle about the longitudinal axis of the inlet conduit 1. In the illustrated example forty apertures have been provided although of course numbers may be varied dependent upon the particular proportion of the liquid it is desired to retain as a sample. The apertures are all equal in size and are equidistant one from the other.

Extending in from the under surface of the metering member 12 are grooves 17 each communicating with an aperture 16. Thirty-nine of the grooves 17 extend radially outwardly from their communicating apertures 16 with one groove 17a equal in size and shape to the other grooves but formed extending radially inwardly from the aperture 16a.

A collecting member 18 is supported on the protruding collar 15 extending from the upper surface of the metering member 12. An annular rebated section is provided adjacent the outer periphery of the collecting member to form a positioning means to accurately locate the collecting member in use. Due to the relative sizes of the supporting collar 15 and the rebate in the collecting member 18, the portion of the under surface 18a of the collecting member and the surface 14a of the metering member 12 are spaced apart one from the other thus defining an annular space communicating with the dividing apertures 16. The upper surface 19 of the collecting member 18 is sloped towards the centre with the inner periphery 20 and the outer surface of the conduit 1 defining an aperture 21 through which the fluid is passed.

A filter 22 is supported extending from adjacent the walls of the diffusion chamber 4 to the inlet conduit 1.

An annular groove is formed in the collecting member 18 to support a rubber sealing ring 23 which protrudes outwardly from the collecting member and forms a sealing pad for the lower periphery of the glass member defining the diffusion chamber 4.

A sample chamber 24 adapted to collect the liquid delivered in a sample flow of liquid is formed by a cylindrical member 25 adapted to have the inlet conduit concentrically passed therethrough. An inwardly protruding collar 26 extends from adjacent the lower periphery of the member 25.

A plug 27 is attached to and extends radially from the inlet conduit 1 towards the lower end thereof with the plug incorporating a sealing ring 28 adapted to seat on the collar 26 to form a fluid tight seal in use. The upper periphery 29 of the cylinder member 25 terminates above the lower periphery of the skirt 6. Also the conduit 10 extends down into the sampling chamber 24.

A collecting chamber 30 is formed with an annular base member 31 attached to and extending from the outer surface of the cylinder member 25 towards the top end thereof, the relative proportions of the component parts being apparent from FIGURES 1 and 2 of the accompanying drawings. A cylinder member 32 extends from the outer periphery of the annular base 31 and in use the upper periphery thereof seats on part of the under surface of the sealing ring 23.

The relative sizes of the chamber 24 and the chamber 30 and the space between the under surface of the shield member 5 and the upper periphery 29 are such as to provide a free passage between the chambers but to minimise excessive surging therebetween in use.

A gauge glass 33 is positioned outside and substantially parallel to the sides of the sampling chamber 24. A passageway extends from the lower end of the chamber 24 above the plug 27 with the connection formed between a short protruding conduit 34 and the glass 33 by a right angled rubber connector 35. A further connecting conduit 36 protrudes from the under surface of the collecting chamber 30 with a rubber sleeve 37 connecting the upper end of the glass 33 in place.

A conduit 38 having the lower end communicating with the gauge glass extends upwardly through the collecting chamber 30 to have the upper inclined periphery thereof positioned adjacent the under surface of the shield member 5.

A scale 39 is mounted adjacent the glass 33 and is held in position by means of a mounting bracket 40. As will be seen end members of the bracket 40 each have a curved portion 41 adapted to engage with the collecting chamber and the partial aperture 42 adapted to hold the gauge glass 33 with the scale fixed to a member joining the two end members.

A draw-off conduit 43 communicating with the chamber 30 extends down the side of the sampling chamber 24 to a valve means 44.

The valve 44 comprises a fixed member 45 attached to the outer surface of the sampling chamber 24 (see FIGURES 6 and 7). The fixed member 45 has a substantially circular face 45a with a peripheral flange 46 extending therefrom. Three ports extend from the face 45a with the relative positions being shown in FIGURE 5.

A centrally positioned outlet port 47 communicates with a conduit 47a which is adapted to be connected to a rubber hose of a milking plant. A delivery port 48 positioned substantially vertically above the outlet port 47 communicates with the draw-off tube 43. The third port 49 communicates with the sampling chamber 24. The port 49 is towards the side of the port 47 and the same radial distance therefrom as the port 48.

The relative position between the port 49 and the outlet 34 when taken in combination with the slightly coned upper surface of the plug 27, provide a small residue pond of liquid which is not drawn off when the sample is removed. The bottom of the gauge glass 33 extends into this pond thus preventing any foam in the sampling chamber 24 from rising in the gauge glass 33 thereby making the level more difficult to read.

A circular disc member 50 is adapted to neatly fit within the protruding flange 46 and coact with the face 45a. The disc member is rotatably held in place by clamping arms 51 extending from a body member 52 positioned to the rear of the fixed member 45. The shape of the body portion 52 is shown in FIGURE 10 and is such that it may be positioned to one side of the outlet conduit 47a while still providing the arms 51 substantially on the diameter of the circle of the disc member as shown in FIGURE 1. A protruding housing 53 extends from the body 52 and houses a biasing spring 54. A fixing screw 55 having a holding flange on the head thereof extends through an aperture 56 in the body 52 and engages with the fixed member 45.

The arms 51 are thus tensioned so that they tend to force the disc member against the fixed member but this tension may be released by moving the body member towards the fixed member against the biasing spring and sliding the disc 50 out over the peripheral flange 46.

The disc member 50 includes a communicating port 57 extending from the centre of the disc and adapted to provide a passageway joining the outlet port with either the supply port or the delivery port. A drain port 58 is positioned to communicate with the supply port and has a short length of conduit turned downwardly to provide a nozzle for directing the fluid passing out therethrough.

A clamping arm 59 having a rubber roller 60 on the end thereof extends up the side of the collecting chamber and has a spring 61 adjustably tensioned by a butterfly clip 62 positioned below a collar 63 to vary the pressure required for positioning the glass bowl in place. Other known types of clamps may equally well be used.

A cylindrical support member 64 is attached to the side of the collecting chamber 30 and has a clamping screw 65 extending through the wall thereof.

A support bracket is provided to support the apparatus above described in the appropriate position in a cow bail, the bracket provided thus being adapted to clamp on to a suitable structural member or board normally positioned in a cow bail. Adjustment means are provided in the clamp to make it more versatile for the varying conditions likely to be experienced.

The bracket comprises a pin 66 adapted to extend through the cylindrical member 64 and a pin carrying arm 67 extending normally from the pin 66 and having a slotted aperture formed towards the rear end thereof. The pin carrying arm 67 is adjustably engaged with a clamping bracket 68 by means of a screw 69. The clamping bracket 68 provides the normal screw clamp with a further support screw 70 to adjustably support the under surface of the supporting arm 67 and thus allow the pin to be adjusted so that the apparatus in use is supported in a substantially vertical plane.

The use of the above described invention will now be described. The apparatus is assembled with the internal parts as shown in FIGURE 3 and the support brackets arranged as shown in FIGURE 2.

The apparatus is positioned in a cow bail and connected as above described. A full control of the apparatus is provided by the valve 44 which when in the "off" position removes the partial vacuum from the teat cups.

When an operator wishes to operate the apparatus he turns the valve means of the protruding communicating passage 57 to the "on" position as shown in FIGURE 1. The vacuum is then applied through the apparatus to the teat cups which are placed on a cow being milked.

Milk and air are drawn into the apparatus with a gulping action to cause an irregular flow through the inlet conduit 1 into the diffusion chamber 4. The proportion of milk and air of course varies considerably from cow to cow and also during the process of milking any individual cow. However a considerable volume of air is mixed with the milk. This mixture is delivered into the diffusion chamber which tends to diffuse the milk and air and pass the resultant mixture down through the filter 22 and on to the upper surface of the member 18. The mixture is directed downwardly towards the aperture 21 and then through the annular space to the dividing apertures 16 thorugh the metering member.

The cross sectional area of the annular aperture 21 and the cross sectional area of the annular space between the upper surface 14a and the under surface 18a are all substantially equal. The mixture of milk and air directed through the annular aperture 21 passes outwardly through the annular space which acts as a filming means and provides at any instant a substantially uniform flow of liquid relative to the surface, that is, the surface 14a over which the fluid is passing. Thus from when the mixture of milk and air is delivered into the diffusion chamber 4 and until it is ready for passing through the apertures 16 it is directed through these various component parts which act as a flow control means.

As was above described forty equal and equi-distant apertures 16 and 16a are provided through which the milk may pass into the grooves 17 and 17a. The combined cross sectional area of the forty apertures is slightly less than the cross sectional area of the inlet conduit.

The distance which the grooves 17 protrude beyond the outer periphery of the sealing pad 8 equal or substantially equal the distance the groove 17a protrudes beyond the periphery of the aperture 9. Also the distances between the centre line of any of the apertures 17 and the inner face of the collecting chamber 30 is substantially the same as the distance from the centre line of the aperture 17a to the far side of the aperture 9 through the sealing pad.

Thus once the flow has been divided the individual flows are discharged under substantially uniform conditions but with one flow directed inwardly to discharge into the sampling chamber 24. There are thus no irregularities or obstacles in the path of any individual flow.

In the case of the apparatus illustrated thirty-nine fortieths of the milk and air are passed down over the dependent skirt 6 into the chamber 30 and may be discharged through the draw-off tube 43, the valve 44 to the outlet 47a, and then into the milk line in the usual way. The dependent skirt 6 of course merely protects the upper periphery of the sampling chamber to obviate or minimise the possibility of milk being splashed over the upper periphery 29 thus giving a false reading in the sample chamber.

One fortieth of the milk and air passing down through the aperture 16a and discharge by a conduit 10 into the sampling chamber 24 where the sample of liquid is stored during the sampling process. The level of liquid in the sampling chamber is measured by the glass gauge 33 with the size of the chamber sufficient to measure on the scale provided a range of between 0 and 50 pounds of milk which may be given by any indivirdual cow.

When the cow has been milked the valve may again then be turned to the "off" position and the volume of milk given by the cow read from the scale positioned against the gauge 33.

The operator then has a choice. He may either reset the machine by drawing the sample milk into the milk line or he may draw all or part of the sample out of the drain port for example for butterfat testing in the usual manner. Depending upon the course he elects the operator would either turn the valve to the position as shown in FIGURE 12 or the position as shown in FIGURE 13.

When the milk has been drawn from the sampling chamber another cow may be tested.

When it is desired to wash the machine the valve is turned to the "reset/flush" position as shown in FIGURE 12. This communicates the outlet 47 with the supply port 49. The teat cups are placed in a bucket of water in the usual way and water is delivered into the chamber 30 but cannot escape therefrom because the port 48 is closed. Thus the supply of water quickly builds up and flushes over the upper periphery 29 into the supply chamber 24 and then out through the supply port. Some of the liquid passes down through the conduit 38 washing the gauge glass 33. This method quickly and efficiently gives the initial wash to the apparatus which may then be dismantled and thoroughly washed.

In this respect it will be noted the slots 17 are readily accessible for scrubbing and thus thorough cleaning which is necessary if acceptable standards of hygiene are to be maintained with this type of apparatus. Similarly it will be apparent that the other components are readily dismounted and easily cleaned.

It will of course be realised that other means of dividing the flow of fluid into a plurality of flows to be delivered in substantially equal conditions could be provided. The invention is not to be confined to any strict conformity to the showings in the drawings but changes or modifications may be made therein so long as such changes or modifications mark no material departure from the spirit and scope of the appended claims.

What I claim is:

1. Apparatus for sampling a flow of liquid from a fluid at least some of which is a liquid, comprising a diffusion chamber, an inlet conduit having an upper end and adapted to be substantially vertically positioned in use for discharging fluid from its upper end into the diffusion chamber, a collecting member below the diffusion chamber arranged concentrically about the inlet conduit and into which fluid passes, said collecting member having an upper face which constitutes the base of the diffusion chamber, said upper face being sloped inwardly and downwardly toward the center with a symmetrical annular opening defined by the inner periphery of the collecting member and the outer periphery of the inlet conduit, a metering member below the collecting member arranged concentrically about the inlet conduit providing a filming means having a floor defined by the upper surface of the metering member and a roof portion defined by part of the under surface of the collecting member, an annular protruding collar extending from adjacent the outer periphery of the metering member upon which the collecting member is supported whereby that part of the under surface of the collecting member and part of the upper surface of the metering member are spaced apart one from the other to provide an annular space stopped at the collar with said space having a substantially symmetrical cross sectional area extending radially outward from the inlet conduit, dividing means cooperable with the metering member and the annular space for providing a plurality of flow paths substantially equal in size and equidistant one from the other so that the flow of the fluid is divided into a plurality of separate but substantially equal flows with at least one of the flows being a sampling flow, sampling means for receiving said sampling flow in a sampling vessel for providing a volume of liquid substantially proportional to the total volume of liquid flowing during the sampling process, and discharge means for collecting and discharging the remainder of the fluid from the apparatus.

2. Apparatus as claimed in claim 1 wherein the upper surface of said metering member is dished adjacent the inlet conduit and over the area onto which the fluid passing through said annular opening surrounding said inlet conduit is delivered with the upper surface of said metering member extending outwardly from said dished section to said protruding collar in a plane substantially normal to the longitudinal axis of said inlet conduit and with the corresponding part of the under surface of said collecting member also in a plane extending substantially normal to said inlet conduit, the construction and arrangement being such that the cross sectional area of said inlet conduit, the cross sectional area of the annular opening leading from said diffusion chamber and the cross sectional area between the under surface of said collecting member and the portion of the upper surface of the metering member parallel therewith are all substantially equal.

3. Apparatus as claimed in claim 2 wherein said dividing means comprises a plurality of equally spaced apertures provided through said metering member, said apertures being equally spaced in a circle around the longitudinal axis of said inlet conduit and positioned adjacent the supporting collar, a plurality of communicating grooves formed extending in from the under surface of said metering member to communicate with the spaced apertures with one groove directed inwardly and the remaining grooves directed outwardly, a shield member attached to said inlet conduit and extending radially therefrom, a sealing pad supported on the upper surface of said shield member, said sealing pad being adapted to support said metering member with an aperture provided through said sealing pad and a communicating aperture through said shield member to form a passageway through which the liquid passing from the inwardly directed groove is delivered to said sampling means and with the liquid passing through the remaining grooves directed outwardly over said sealing pad and down the outer periphery of said shield member into a collecting chamber forming part of said discharge means.

4. Apparatus as claimed in claim 3 wherein forty equally sized apertures equi-distant one from the other are provided through said metering member with thirty-nine of the grooves directed outwardly and one groove directed inwardly and with the combined cross sectional area of the forty apertures being slightly less than the cross sectional area of the inlet conduit.

5. Apparatus as claimed in claim 4 wherein the portion of each outwardly directed groove extending over the outer periphery of said sealing pad is substantially equal to the portion of the inwardly directed groove extending over the aperture provided through said sealing pad to communicate wits said sampling means.

6. Apparatus as claimed in claim 5 wherein said sampling means comprise a cylindrical member concentrically positioned surrounding said inlet conduit and in use having the upper periphery thereof positioned adjacent the base of said shield member, an annular collar extending inwardly from the lower end of the curved bounding surface of said cylindrical member, a base plug fixed to extend radially from said inlet conduit and adapted to engage with said collar to complete a fluid tight annular chamber surrounding said inlet conduit, a visual calibrated gauge glass positioned outside said cylindrical member and extending substantially parallel thereto and a passageway extending through adjacent the base of said cylinder member to the lower end of said gauge with said gauge being calibrated to show the total amount of liquid passed through said apparatus using the level of the proportional sample delivered into said sampling chamber.

7. Apparatus as claimed in claim 6 wherein said collecting chamber comprises an annular base extending outwardly from and attached to the cylindrical member of said sampling chamber and a cylindrical casing extending upwardly from the annular base and concentrically mounted about said inlet conduit, the upper periphery of said cylindrical casing protruding above said metering member and a sealing ring extending outwardly from said collecting member upon which said upper periphery of said casing seats.

8. Apparatus as claimed in claim 7 wherein said outwardly directed grooves and said inwardly directed groove are substantially equal in size with the distance between the centre of the aperture leading to the inwardly directed groove and the far side of the aperture through said sealing pad substantially equal to the distance between the centre line of any of the apertures leading to an outwardly directed groove and the inner face of the curved bounding surface of said collecting chamber.

9. Apparatus as claimed in claim 8 wherein said gauge glass extends between a connection protruding from the annular base of said collecting chamber and a connection extending from adjacent the lower end of said cylindrical member in said sampling chamber with a removable mounting member supporting a scale against said gauge glass and with a conduit extending internally through said collecting chamber from the upper end of said gauge glass to a position adjacent the under surface of said shield member.

10. Apparatus as claimed in claim 9 wherein the space of said collecting chamber is of a sufficient volume relative to the space in said sampling chamber to prevent surging between the chambers in use caused by the unequal division of air delivered to the respective chambers in said fluid and with the space from the shield member to the upper periphery of said cylindrical member of the sampling chamber to allow for a free passage of air between the two chambers.

11. Apparatus as claimed in claim 7 wherein the discharge means comprises said collecting chamber and a draw-off conduit extending from adjacent the base thereof, a valve means through which said draw-off conduit passes, and a connection means operably coupled to the valve means adapted to be connected to the milk line of a milking plant.

12. Apparatus as claimed in claim 11 wherein said valve means comprises a fixed circular member having a circular flat face with a centrally positioned outlet port, a delivery port communicating with said delivery conduit and a sample port communicating with said sample chamber, said delivery port and said sample port being substantially equi-distant from said outlet port, a rotatable disc member held in engagement with said fixed member, said disc member having a communicating passageway extending from the centre radially outwardly for a distance sufficient to communicate with said sample or said delivery port in said fixed member and a drain port adapted to communicate with said sample port.

13. Apparatus as claimed in claim 12 wherein said fixed circular member has a protruding peripheral flange around the flat face, said flange being adapted in use to confine part of the edge of said disc member, clamping means extending from the rear of said fixed member to engage with the outer face of said disc member for rotatably holding said disc member in place and said clamping means being biased to hold said disc member against the flat face of said fixed member.

14. Apparatus as claimed in claim 13 wherein said clamping means comprises a body member positioned at the rear of said fixed circular member, holding arms extending from said body member to engage with the outer face of said disc member at points substantially 180 degrees apart, a fixing screw passing through an aperture in said body member to engage with said fixed member and a biasing spring having one end housed in a protruding portion of said body member and the other end abutting against the fixed member, the construction and arrangement being such that said body member may be moved forwardly towards said fixed member against the action of said biasing spring thereby releasing the arms from the outer surface of said disc member and allowing said disc member to be removed from the confines of the peripheral flange extending from said fixed member.

15. Apparatus for sampling a flow of liquid from a fluid at least some of which is a liquid, said apparatus comprising an inlet conduit adapted to be substantially vertically positioned in use to discharge a flow from its upper end, a diffusion chamber into which said fluid is discharged, a collecting member having the upper face thereof forming the base of said diffusion chamber, said upper face being sloped inwardly and downwardly towards the centre with a symmetrical annular opening defined by the inner periphery of said collecting member and the outer surface of said inlet conduit, a metering member positioned radially about said inlet conduit having an annular protruding collar extending from the upper face adjacent the outer periphery thereof to support said collecting member so that part of the upper surface of said metering member and part of the under surface of said collecting member are spaced apart one from the other to define an annular space stopped at said collar, said space having a substantially symmetrical cross-sectional area extending radially outwardly from said inlet conduit, dividing apertures provided through said metering member, said apertures being equally spaced in a circle around a longitudinal axis of said inlet conduit and positioned adjacent the supporting collar extending from the upper surface of said metering member, a plurality of communicating grooves formed extending in from the under surface of said metering member to communicate with the dividing apertures, with one groove directed inwardly and the remaining grooves directed outwardly, a shield member attached to said inlet conduit and extending radially therefrom, a sealing pad supported on the upper surface of said shield member, said sealing pad being adapted to support said metering member with an aperture provided through said sealing pad and a communicating aperture through said shield member to form a passageway through which the liquid passing from the inwardly directed groove is delivered into a sampling chamber and with the liquid passing through the remaining said grooves directed outwardly over said sealing pad and down the outer periphery of said shield member, sampling means adapted to receive said sampling flow and collect the liquid in said sampling flow in a sampling chamber to provide a volume of liquid substantially proportional to the total volume flowing during the sampling process and discharge means adapted to collect the remainder of said fluid passing outwardly over the outer periphery of said shield member and discharge the collected fluid from said apparatus.

16. Apparatus as claimed in claim 15 wherein said fluid flow is created by a partial vacuum and said fluid at least some of which is a liquid comprises a mixture of air and milk delivered from the teat cups of a milking plant.

17. Apparatus for sampling a flow of liquid from a fluid at least some of which is a liquid, said apparatus comprising an inlet conduit adapted to be substantially vertically positioned in use to discharge fluid from its upper end, a diffusion chamber surrounding the upper end of said inlet conduit to diffuse fluid deliverd thereto from said inlet conduit, a collecting member having the upper face thereof forming the base of said diffusion chamber, the upper face of the collecting member being sloped inwardly and downwardly towards the centre with a symmetrical annular opening defined by the inner periphery of said collecting member and the outer periphery of said inlet conduit, a filter positioned between the upper end of said inlet conduit and the upper surface of said collecting member, a metering member extending from said inlet conduit below said collecting member, an annular protruding collar extending from the upper surface adjacent the outer periphery of said metering member supporting said collecting member so that part of the under surface of said collecting member and part of the upper surface of said metering member are spaced apart one from the other to define an annular space stopped at said collar, said space having a substantially symmetrical cross sectional area extending radially outwardly from said inlet conduit with the cross sectional area of said inlet conduit, the cross sectional area of the annular opening leading from said diffusion chamber, and the cross sectional area between the under surface of said collecting member and the upper surface of said metering member adjacent the supporting collar all being substantially equal, dividing apertures provided through said metering member, said apertures being equally spaced in a circle around the longitudinal axis of said inlet conduit and positioned adjacent the supporting collar, a plurality of communicating grooves extending in from the under surface of said metering member to communicate with the dividing apertures with one groove directed inwardly and the remaining grooves directed outwardly, a shield member attached to the inlet conduit below said metering member and extending radially therefrom, a sealing pad supported on the upper face of said shield member, said sealing pad being adapted to support said metering member with an aperture provided through said sealing pad and a communicating aperture through said shield member to form a passageway through which the liquid passing from the inwardly directed groove is delivered to a sampling means with said liquid passing through the remaining grooves directed outwardly over said sealing pad and down the outer periphery of said shield member, a sampling chamber surrounding said inlet conduit and a collecting chamber extending from adjacent the upper end of said sampling chamber with air-tight joints between the component parts enabling said fluid flow to be caused by a partial vacuum, a gauge glass positioned substantially parallel to said inlet conduit and on the outer face of said sampling chamber to visually indicate the level of fluid in said sampling chamber, a draw-off conduit extending from said collecting chamber, and valve means provided to control the flow of fluid through said apparatus so that in use the sampling flow collected in the sampling chamber provides a volume of liquid substantially proportional to the total volume of liquid flowing during the sampling process.

References Cited by the Examiner
UNITED STATES PATENTS 3,013,431  12/1961  Splettstoeser ____ 119—14.17 X
3,163,047  12/1964  Jaquith _____ 73—422

RICHARD C. QUEISSER, *Primary Examiner.*

DAVID SCHONBERG, *Examiner.*

J. W. MYRACLE, *Assistant Examiner.*